J. B. HARDS.
Wheel Hub.
No. 106,361.
Patented Aug. 16, 1870.
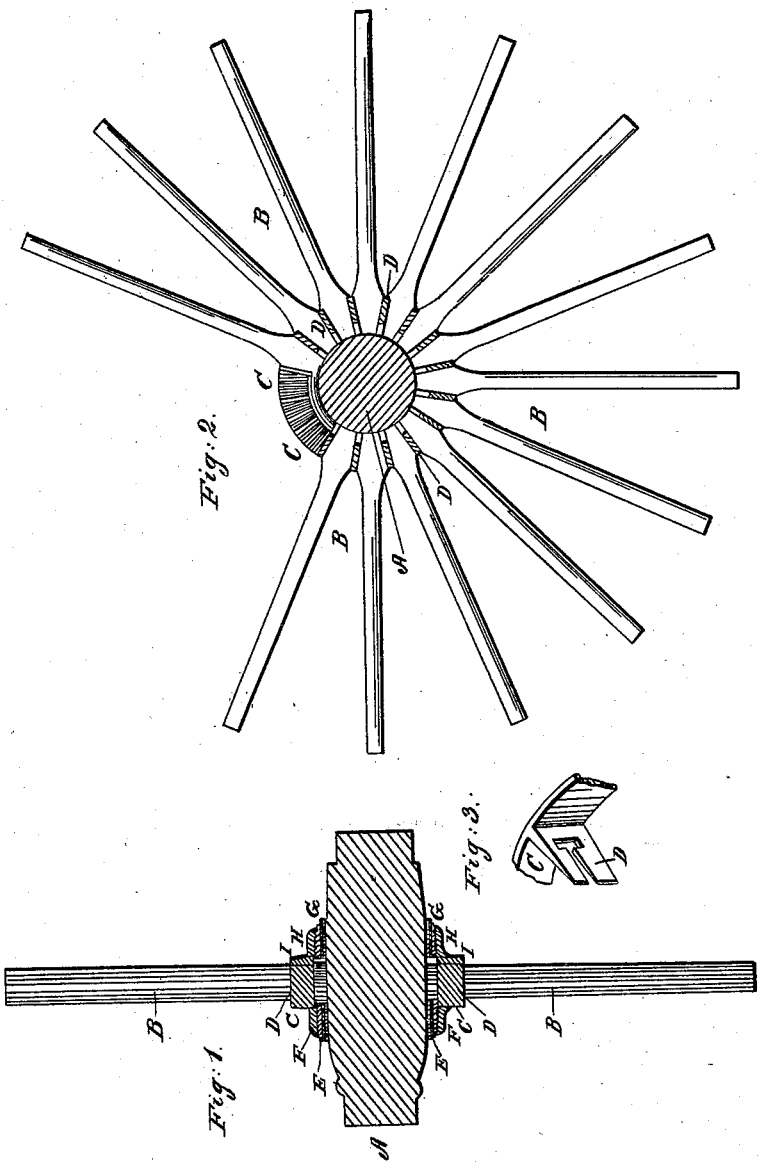

United States Patent Office.

JOHN B. HARDS, OF CHICAGO, ILLINOIS.

Letters Patent No. 106,361, dated August 16, 1870.

IMPROVEMENT IN WHEEL-HUBS.

The Schedule referred to in these Letters Patent and making part of the same

*To all whom it may concern:*

Be it known that I, JOHN B. HARDS, of Chicago, in the county of Cook and State of Illinois, have invented a new and improved Wheel-Hub; and I do hereby declare the following to be a full, clear, and exact description thereof, which will enable others skilled in the art to which my invention appertains to make and use the same, reference being had to the accompanying drawing forming part of this specification.

Figure 1 is sectional view of a carriage-wheel and hub taken in the plane of the line $x$ $x$, fig. 2.

Figure 2 is a transverse section of the same, taken in the line $x$ $x$, fig. 1.

Figure 3 is a sectional view of part of the flanged rim to which the spokes are secured.

Similar letters of reference indicate corresponding parts in the several figures of the drawing.

My invention has for its object to improve the means for securing the spokes of carriage and other wheels to their hubs, and consists primarily in a wheel for vehicles, having its spokes so attached to the hub as to be be capable of adjustment to regulate the disk of the wheel.

It also consists in the combination of devices by which this result is obtained, and in the peculiar construction of parts, as will be hereinafter more fully described.

In the accompanying drawing—

A is the hub of an ordinary carriage-wheel, composed of wood or metal, and

B are the spokes.

C is a metal ring affixed to the center of the hub, and having cast upon its inner side a series of wedge-shaped flanges, D, arranged at equal distances apart, to form sockets for the reception of the ends of the spokes. The flanges are arranged in radial lines from the center of the hub, and consequently two sides of each socket are beveled, as shown.

E is the flat metal band, provided with an exterior screw-thread, and shrunk onto the hub in front of the ring C, with one edge within said ring, as shown in fig. 1.

The ends of the spokes are driven into radial mortises formed in the hub, and are beveled upon opposite sides, to correspond with the radial bevel of the sockets and the lateral bevel of the flanges D. By this method the spokes are dovetailed into the sockets, as will be readily understood.

F is a flat metal ring, adapted to screw upon the band E, to bear against the side of the ring C, to prevent the latter from moving or being moved toward the outer end of the hub.

G is another flat band of metal, shrunk onto the hub from the inner end of the latter near the spokes, and provided with an external screw-thread to receive a tightening ring, H, by which an annular band, I, is clamped firmly against the spokes on that side next the inner end of the wheel-hub.

By tightening up the ring H it is evident that the spokes are held in place, from the fact that they cannot be removed excepting from that side of the ring C next the tightening-ring.

If at any time the wheel should become dished beyond the extent first given it, the ring H is loosened somewhat, and the spring F screwed further upon the band E.

This operation forces the ring C toward the inner end of the hub, and, as the ends of the spokes are in mortises formed in the hub, it is evident that the pressure of the ring C upon the sides of the spokes will cause the latter to assume a position nearly at right angles to the major axis of the hub. In this position they are securely held by again tightening up the ring H.

The spokes may be held in place still further by casting several of the flanges D with T-sharpened slats, as shown in fig. 3, and inserting T-headed bolts in said slats between the spokes with their ends projecting through the band I to receive tightening-nuts.

When these bolts are employed, the band I is of course held against the spokes, and cannot be removed without first removing the nuts.

By my invention the spokes are not only applied to wheel-hubs in the most simple and expeditious manner, but the dish of the wheel can be regulated at any time without removing the spokes.

Having thus described my invention,

What I claim as new, and desire to secure by Letters Patent, is—

1. A wheel for vehicles, having its spokes attached to the hub in the manner described, so as to be capable of adjustment to regulate the dish of the wheel, substantially as specified.

2. In combination with the hub and spokes of a carriage-wheel, the flanged ring C, screw-bands E G, screw-rings F H, and annular band I, substantially as described, for the purpose specified.

3. The ring C, having its flanges D so constructed and arranged as to form lateral dovetail sockets for the reception of the spokes, substantially as herein shown and described.

4. In combination with the annular band and the spokes, the slatted flanges of the ring C and the T-headed bolts, substantially as described, for the purpose specified.

JOHN B. HARDS.

Witnesses:
WILLIAM HODWETT,
E. A. ELLSWORTH.